(12) United States Patent
Lester (10) Patent No.: US 7,581,863 B2
(45) Date of Patent: Sep. 1, 2009

(54) LASER LIGHT SOURCE ADAPTED FOR LCD BACK-LIT DISPLAYS

(75) Inventor: Steven D. Lester, Palo Alto, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 119 days.

(21) Appl. No.: 11/198,474

(22) Filed: Aug. 4, 2005

(65) Prior Publication Data

US 2007/0030690 A1 Feb. 8, 2007

(51) Int. Cl.
G02B 6/04 (2006.01)
(52) U.S. Cl. .................... 362/561; 362/611
(58) Field of Classification Search ......... 362/600–630, 362/555, 558; 345/83
See application file for complete search history.

(56) References Cited

U.S. PATENT DOCUMENTS

| | | | |
|---|---|---|---|
| 5,301,090 A * | 4/1994 | Hed | 362/558 |
| 6,464,366 B1 * | 10/2002 | Lin et al. | 362/616 |
| 6,637,924 B2 * | 10/2003 | Pelka et al. | 362/555 |
| 6,744,480 B2 | 6/2004 | Kaneko | |
| 6,789,910 B2 * | 9/2004 | Kimura et al. | 362/600 |
| 2002/0176036 A1 | 11/2002 | Kaneko | |

FOREIGN PATENT DOCUMENTS

| | | |
|---|---|---|
| EP | 1 477 840 | 11/2004 |
| JP | 11 149813 | 6/1999 |
| JP | 11149813 | 6/1999 |
| JP | 2005 091494 | 4/2005 |
| WO | WO 92/02006 | 2/1992 |
| WO | WO 95/20811 | 8/1995 |
| WO | WO-95/20811 | 8/1995 |
| WO | WO 03/056369 | 7/2003 |
| WO | WO 2006/059264 | 6/2006 |

* cited by examiner

*Primary Examiner*—Anabel M Ton

(57) ABSTRACT

A light source and a display utilizing the same are disclosed. The light source includes a laser, a light pipe, and an optical fiber. The light pipe includes a layer of transparent material having a top surface, a bottom surface, and a first edge. The first optical fiber couples light from the laser to the first edge at a first location. The light is injected into the light pipe such that the light is reflected from the top surface and the light pipe includes a plurality of scattering centers that scatter the light through the top surface. The laser can be in thermal contact with a heat sink placed at a location that is adapted for dissipating heat. The light source can include a plurality of lasers in a color display. The light from the various lasers can be mixed before it reaches the light pipe or in the light pipe.

29 Claims, 7 Drawing Sheets

LASER LIGHT SOURCE ADAPTED FOR LCD BACK-LIT DISPLAYS

BACKGROUND OF THE INVENTION

Liquid crystal displays (LCDs) are used in a wide variety of computers and consumer devices such as TVs. A back-lit LCD is an array of pixels in which each pixel acts as a shutter that either passes or blocks light from a light source that is located behind the pixel. Color displays are implemented by equipping the pixels with color filters such that each pixel transmits or blocks light of a particular color. The intensity of the light from each pixel is set by the time the pixel is in the transmissive state.

The display is typically illuminated by a white light source that provides a uniform intensity of light across the back surface of the display. Illumination sources based on fluorescent lights are particularly attractive because of their high light output per watt-hour of power consumed. However, such sources require high driving voltages which makes them less attractive for battery operated devices.

As a result, there has been considerable interest in utilizing light sources based on LEDs in such applications. LEDs have similar electrical efficiency and long lifetimes. In addition, the driving voltages needed are compatible with the battery power available on most portable devices.

The illumination system typically utilizes some form of light box or light pipe behind the LCD array. Light is injected into this light box at the periphery of the light box. The surface of the light box opposite to the surface that is adjacent to the LCD array has some form of scattering covering that scatters the light so that the back surface of the LCD is uniformly illuminated.

The thickness of the light source is limited by the thickness of the light box. The thickness of the display is particularly important in displays used for laptop computers and handheld devices such as PDAs and cellular telephones, as the display thickness limits the overall thickness of the device. Some of these portable devices require light boxes that are less than 10 mm thick. As the thickness of the light box is reduced, the efficient injection of light into the light box from the sides in a manner that assures uniform illumination becomes more difficult.

In addition, large displays present a power dissipation problem. Most of the power applied to the light source is converted to heat, rather than light. Since LED-based light sources are confined to the periphery of the light box, this heat is concentrated in the region around the periphery of the light box. Transferring the heat from the edge of the light pipe to a surface that is better adapted for transferring the heat to the environment outside the display poses significant problems.

SUMMARY OF THE INVENTION

The present invention includes a light source and a display utilizing the same. The light source includes a first laser, a light pipe, and a first optical fiber. The laser emits light at a first wavelength. The light pipe includes a layer of transparent material having a top surface, a bottom surface, and a first edge. The first optical fiber has a first end proximate to the first edge and a second end that receives light from the first laser. The light from the first end is injected into the light pipe at a first location. The light pipe can include scattering centers that scatter the light such that a portion of the scattered light strikes the top surface of the light pipe at angles such that the scattered light leaves the light pipe through the top surface. The light source can be used to construct a display by placing the light pipe adjacent to a display element such that the display element is illuminated with light from the light pipe.

DETAILED DESCRIPTION OF THE PREFERRED EMBODIMENTS OF THE INVENTION

Figure 1:
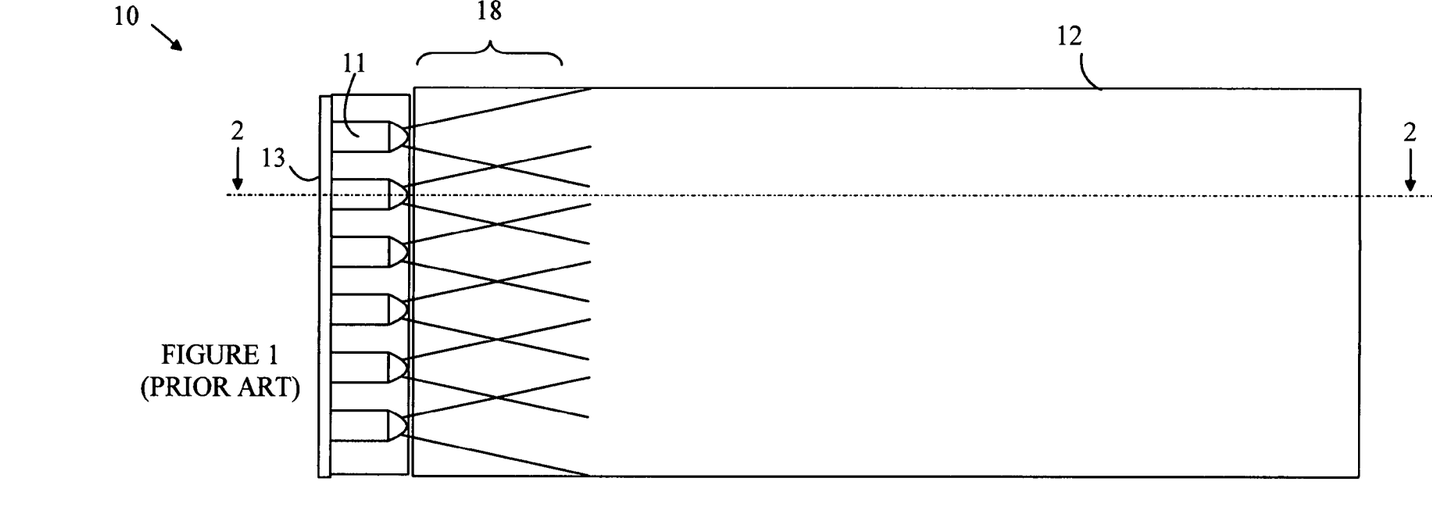
FIG. 1 is a top view of prior art light source 10.
Figure 2:
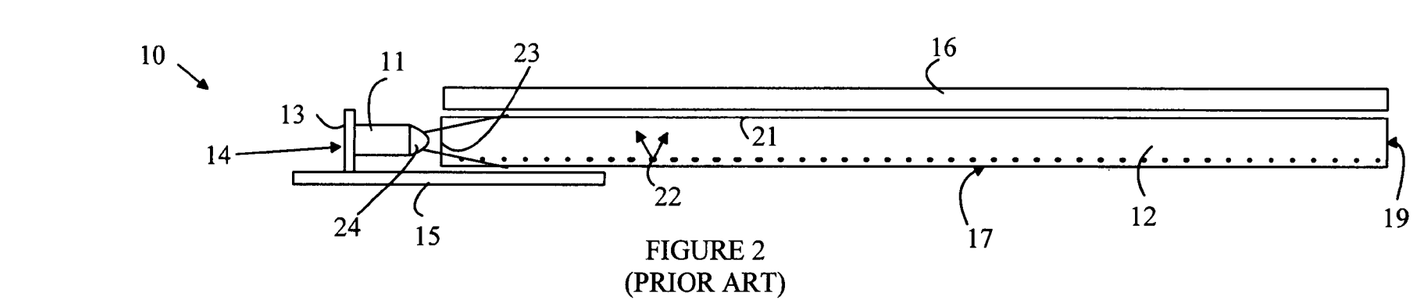
FIG. 2 is a cross-sectional view of light source 10 through line 2-2.

The manner in which the present invention provides its advantages can be more easily understood with reference to FIGS. 1 and 2, which illustrate a prior art light box arrangement for illuminating an LCD display 16. FIG. 1 is a top view of light source 10 and FIG. 2 is a cross-sectional view of light source 10 through line 2-2. Light source 10 utilizes an array of LEDs 11 to illuminate a light pipe 12. The LEDs are mounted on a circuit board 13 that is mounted on a second board 15 that provides power to the LEDs. The LEDs are positioned such that light leaving the top of each LED illuminates the end of light pipe 12. The light entering light pipe 12 at an angle greater than the critical angle with respect to the normal of surface 21 is reflected back and forth within light pipe 12 until the light is either absorbed or scattered by particles 22 on surface 17. The scattered light that strikes surface 21 at angles greater than the critical angle escapes from the light pipe and illuminates the back surface of LCD display 16.

The arrangement shown in FIGS. 1 and 2 has a number of problems. First, the LEDs provide a light source having a divergent beam that can only make a small number of passes across the light pipe before it is lost, even in the absence of the scattering centers. Assume that end 19 of the light pipe is a good reflector. The light that reaches end 19 is reflected back toward the array of LEDs. A significant fraction of the light that strikes the end adjacent to the LEDs will be lost even if substrate 13 is reflective, since the light will be scattered or absorbed by the LEDs. Hence, to provide efficient illumination of surface 21, there must be sufficient scattering centers to effectively move all of the light traveling in the light pipe toward surface 21. As a result, the intensity of light as it travels from the LEDs to end 19 is substantially reduced. This reduction in intensity leads to an intensity gradient along surface 21 unless the scattering centers are distributed in a non-uniform manner along surface 17. The proper pattern is a sensitive function of the geometry of the light injection at surface 15, and hence, this solution places significant restrictions of the alignment tolerance for the light source, and hence, increases the cost of the light source.

Second, the mixing of the light from the LEDs is poor, particularly in the region 18 near the LEDs. This problem is made worse by the use of individual packaged LEDs, as the distance between light sources must be sufficiently large to accommodate the packaging of the individual LED chips. Hence, either the edge of LCD display 16 will either be poorly illuminated or the light pipe must be extended such that the area of non-uniform illumination is not under the LCD supply. The latter solution increases the size of the apparatus in which the display is being used, and hence, is undesirable.

Third, the heat generated by the LEDs must be dissipated either on the back surface 14 of printed circuit board 13 or by being conducted to printed circuit board 15. The area available for heat dissipation on surface 14 is limited by the height of printed circuit board 13. As the display thickness is reduced, this height must also be reduced. Alternatively, the heat can be conducted through printed circuit board 13 to printed circuit board 15 that has a larger area available for heat dissipation. However, the heat flow is restricted by the thickness of printed circuit board 13. In addition, this solution places restrictions on the placement of printed circuit board 15, as the board must be close to a surface that can dissipate the heat to the outside environment. Finally, if printed circuit board 15 is heated significantly, printed circuit board 15 will flex due to the thermal expansion of the interior core that is carrying the heat. Such a flexure can alter the alignment of the LEDs relative to the light pipe thereby altering the geometry of the light injection into the light pipe.

Fourth, a significant fraction of the light generated by the LEDs is lost at the air-light pipe interface due to reflections arising from the difference in index of refraction between the light pipe and the air. If the space between the LED lens 24 and the light pipe end 23 is filled with an index of refraction material, the imaging properties of the lens are lost, and hence, a significant fraction of the light generated by the LED will not be imaged into the narrow light pipe.

The present invention is based on the observation that light from a laser, unlike light from an LED, is inherently collimated, and hence, can be more efficiently coupled into the light pipe than light from an LED. The coupling can be carried out with the aid of a light guide such as an optical fiber, and hence, the laser can be placed some distance from the light pipe, thereby permitting the laser to be placed at a location that is more optimal with respect to dissipation of heat from the laser.

Figure 3:
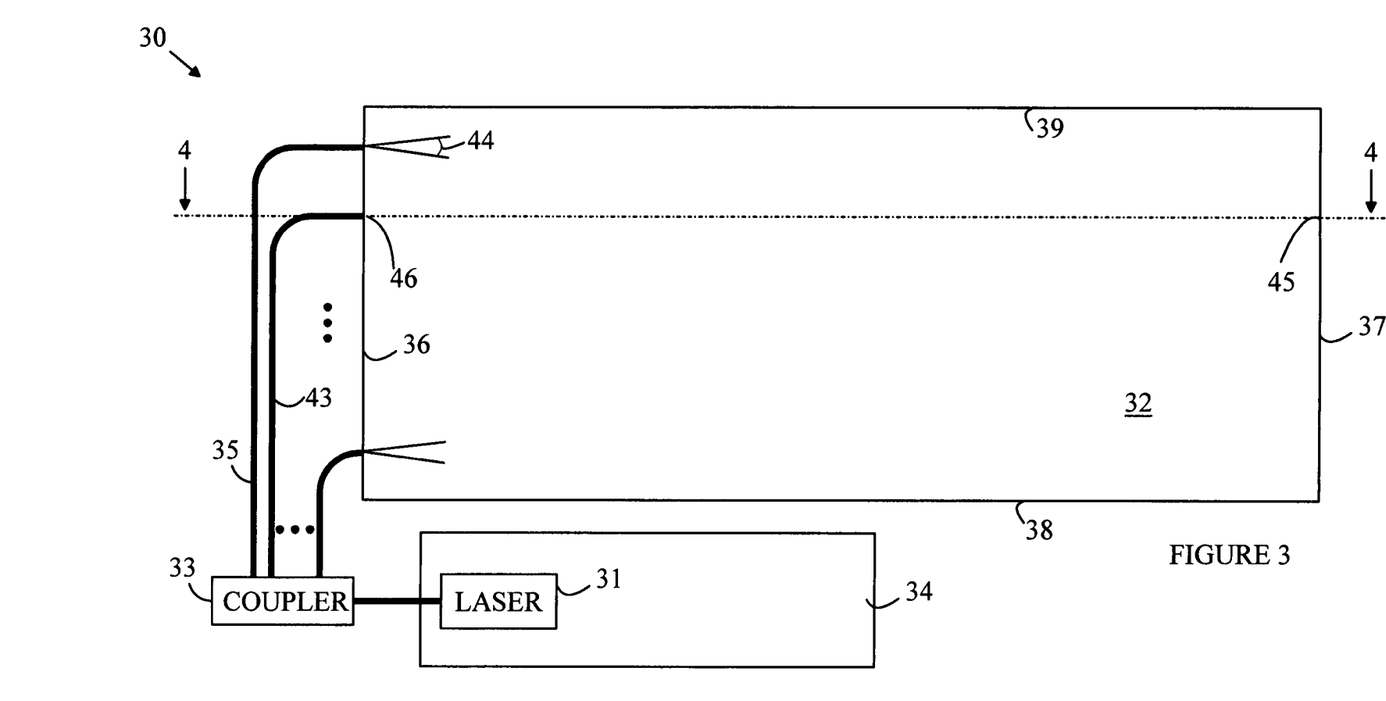
FIG. 3 is a top view of light source 30 according to one embodiment of the present invention.
Figure 4:
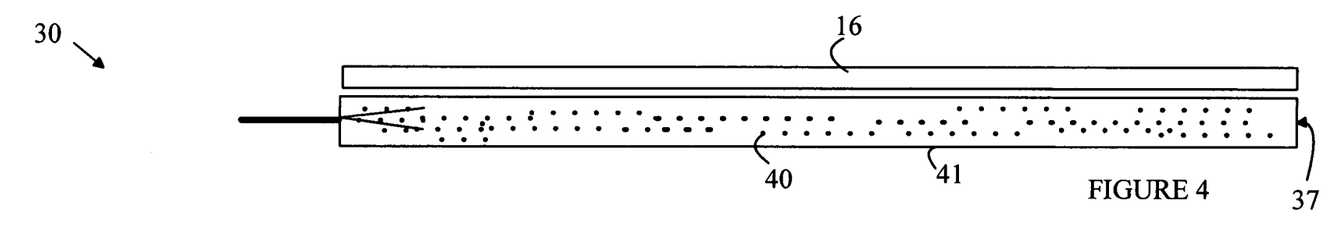
FIG. 4 is a cross-sectional view of light source 30 through line 4-4.

Refer now to FIGS. 3 and 4, which illustrate one embodiment of a light source according to the present invention. FIG. 3 is a top view of light source 30, and FIG. 4 is a cross-sectional view of light source 30 through line 4-4. To simplify the following discussion, light source 30 only utilizes light of a single color to illuminate LCD display 16. The manner in which a light source having a plurality of colors is constructed will be discussed in more detail below. Light source 30 includes a light pipe 32 that is illuminated by light from a laser 31. The light from laser 31 is coupled to a plurality of optical fibers such as fiber 35 by a coupler 33. The optical fibers are bonded to edge 36 of light pipe 32.

With the exception of the areas in edge 36 through which the light enters, edge 36 is reflective. In addition, the remaining edges shown at 37-39 and the bottom surface 41 of light pipe 32 are also reflective. Hence, light that is introduced into light pipe 32 is reflected from the top and bottom surfaces and from the sides until the light is either absorbed or scattered by the scattering centers shown at 40 and leaves the light pipe in the direction of LCD panel 16.

It should be noted that even in the case of a very thin light pipe, the diameter of the optical fibers is much smaller than the thickness of the light pipe, and hence, most of the light striking surface 36 is reflected back into light pipe 32 by that surface. The small amount of light that escapes back into the optical fibers is coupled back to laser 31. Laser 31 has a cavity with two mirrors, one at each end. Most of the light returning to laser 31 will be reflected back into the optical fibers by the first mirror. The remaining light will enter the laser cavity where it will be amplified and returned to the optical fibers. Hence, most of the light that escapes through the optical fibers from light pipe 32 will be returned to light pipe 32.

Light pipe 32 is constructed from a material having an optical transmission length that is much greater than the largest dimension of light pipe 32. For the purposes of this discussion, the optical transmission length is defined to be the distance the light must travel in the light pipe to reduce the intensity of the light by half either because of scattering or absorption. In one embodiment, the optical transmission length is at least 2 times the maximum dimension of the light pipe, and hence, the light entering light pipe 32 will make a large number of passes back and forth across the light pipe before it is absorbed or scattered out of the light pipe. Here, the density of scattering centers 40 is set to a value that assures that the change in light intensity of a light beam traversing the length of light pipe 32 will be negligible on any single pass through the light pipe. Hence, even with a uniform density of scattering centers, the light intensity will be substantially uniform across the top surface of light pipe 32.

In the embodiment shown in FIGS. 3 and 4, the scattering centers are distributed throughout the light pipe. However, embodiments in which the scattering centers are located on either the top or bottom surfaces of the light pipe can also be constructed.

It should be noted that laser 31 can be located at a substantial distance from light pipe 32. This allows laser 31 to be mounted on a heat sink 34 that is thermally connected to a surface of the device in which LCD panel 16 is mounted. For example, heat sink 34 can be part of the outer surface of the case of the device.

It should also be noted that the optical fibers are flexible, and hence, small changes in the relative positions of heat sink 31 and light pipe 32 will not cause a significant change in the geometry of the light beams entering light pipe 32. Accordingly, the problems discussed above with respect to the underlying printed circuit board flexing to heating of the board by the illumination source, or other components on the board, are significantly reduced in the present invention.

Since the light makes many passes across the light pipe, losing a little light to LCD panel 16 on each pass, the mixing region 18 discussed above with reference to FIGS. 1 and 2 is not required. Hence, the light pipe utilized in the present invention can be significantly smaller than that required in prior art light sources.

If edge 37 is substantially parallel to edge 36, the resultant illumination pattern will tend to be one of a number of bright bands. The angle of divergence 44 of the light leaving the ends of the optical fibers is relatively small. Consider the light leaving optical fiber 43. The light will travel along line 4-4 until it strikes surface 37 at point 45. The light will then be reflected back to point 46 where it will be reflected back to point 45, and so on. The beam will be expanding slowly on each pass. However, the expanding beams will all be centered on line 4-4. This leads to a bright band having an intensity that is greatest along line 4-4 and falling off in intensity with the distance perpendicular to line 4-4. While the scattering centers will tend to smooth this distribution of light, the banded pattern will still be present to some degree.

In principle, the banding problem can be reduced by increasing the number of optical fibers such that the adjacent bands overlap to a greater extent. However, this solution increases the cost of the light source.

Figure 5:
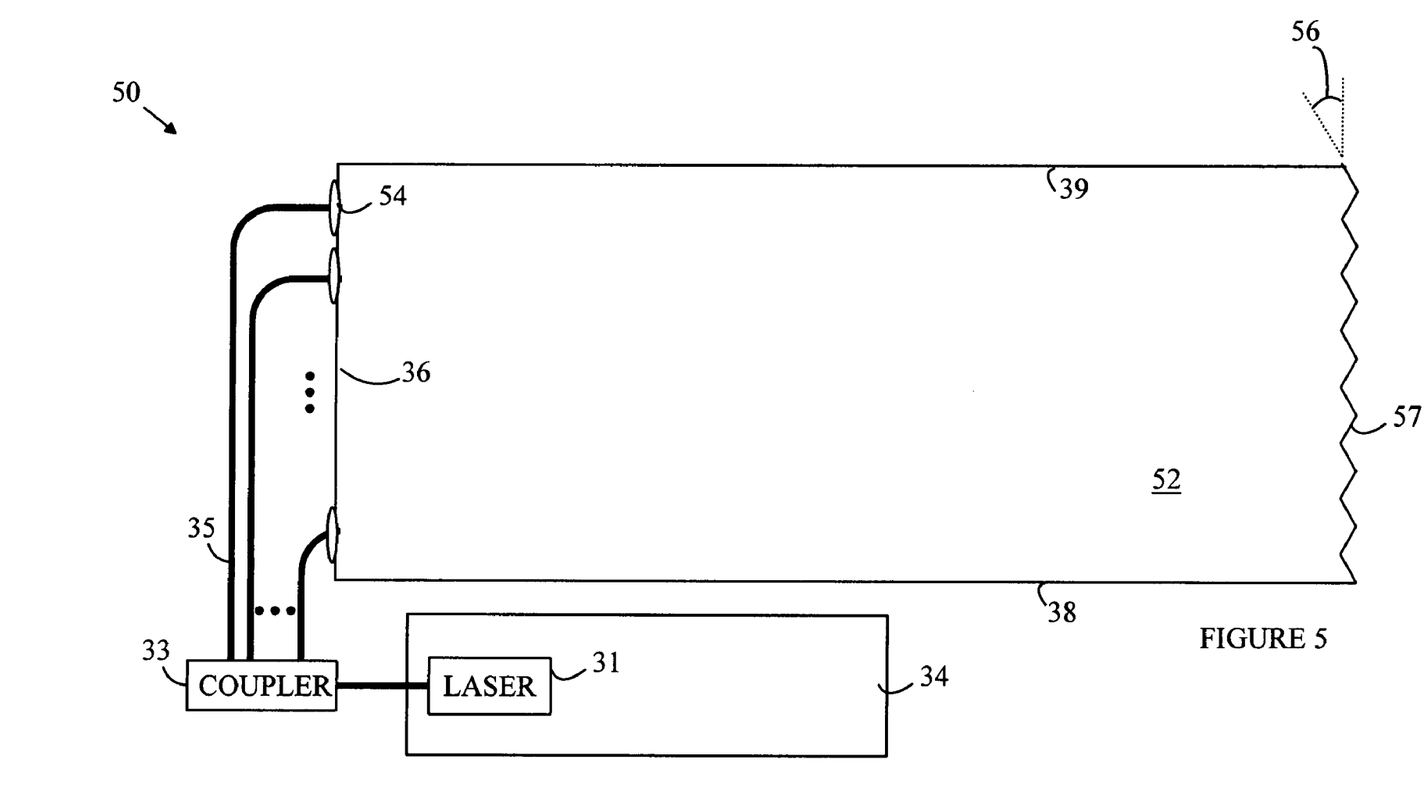
FIG. 5 is a top view of a light source 50 according to another embodiment of the present invention.

Refer now to FIG. 5, which is a top view of a light source 50 according to another embodiment of the present invention. To simplify the following discussion, those elements of light source 50 that serve functions analogous to elements of light source 30 discussed above have been given the same numeric designations and will not be discussed further here. Light source 50 differs from light source 30 in that light pipe 52 includes a faceted edge 57. The facets are planar mirrors that reflect light striking the mirrors at angles such that the light beams from the optical fibers are reflected at angles that are oblique with respect to sides 36, 38 and 39. In general, the planes of the facets are perpendicular to the top and bottom surfaces of light pipe 52, and hence, the facets do not reflect light in a manner that causes the light to strike the top or bottom surfaces of light pipe 52 at an angle that is greater than the critical angle. Hence, the reflections redirect the light in the light pipe without causing the light to be lost from the light pipe. This arrangement improves the mixing of the light from the various optical fibers, and hence, reduces the bands discussed above.

While the angles 56 of the facets shown in FIG. 5 are relatively large, it is to be understood that relatively small angles can be utilized. The angle of the facets needs only to be sufficient to cause the light beam from a given fiber to return to edge 36 at a location that is displaced relative to the fiber by a distance that is sufficient to prevent the light banding. For example, a facet angle that moves the beam by the width of the beam or the diameter of the optical fiber is sufficient.

It should also be noted that such facets can be included in the other edges, including edge 36, to further mix the light. In this regard, it should be noted that the faceted edge could include flat areas between facets for bonding the optical fibers to the edge of the light pipe.

Figure 6:
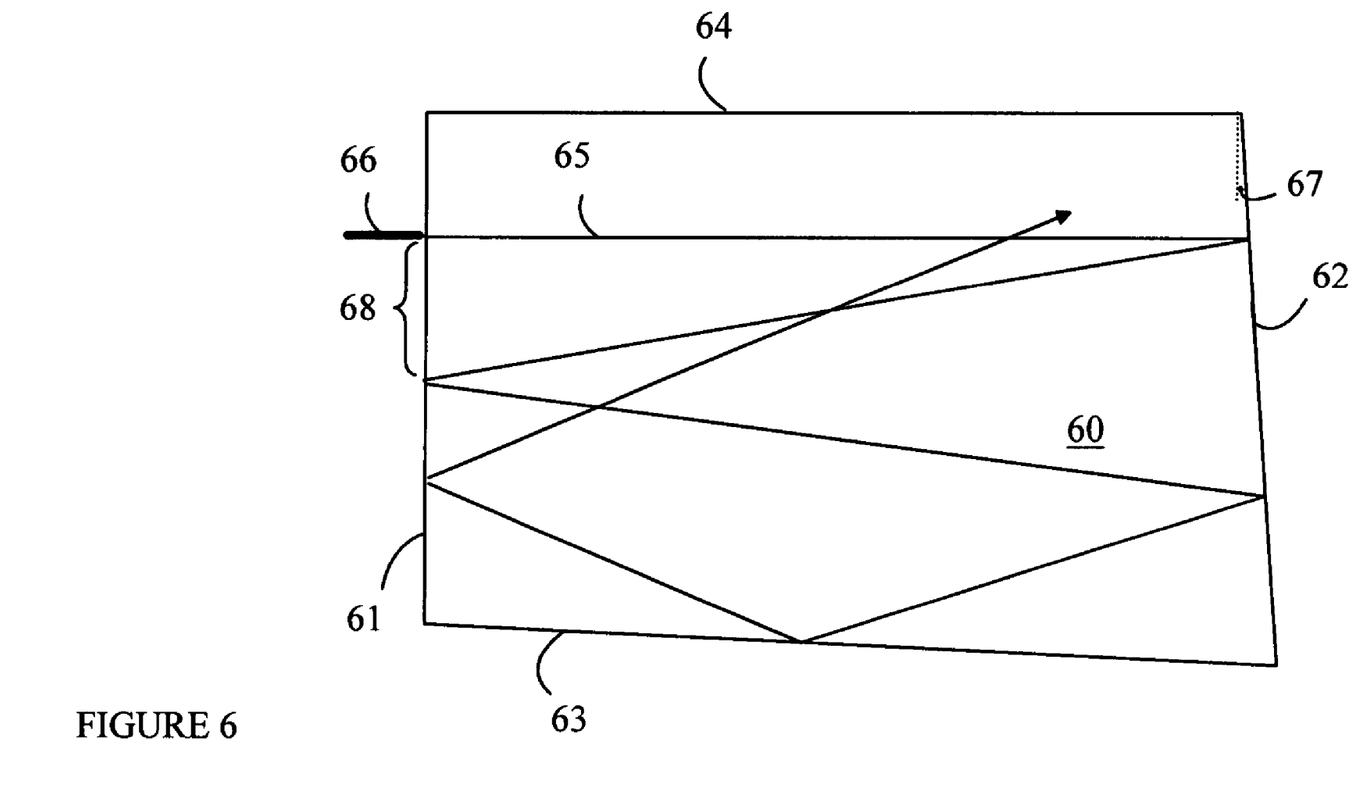
FIG. 6 is a top view of a light pipe 60 in which the edges of the light pipe are not parallel to one another.

An alternative mixing arrangement can be implemented by using a light pipe in which the edges are planar, and in which the opposite edges are inclined at a slight angle with respect to one another. Refer now to FIG. 6, which is a top view of a light pipe 60 in which the edges 61-64 of the light pipe are not parallel to one another. To simplify the drawing only the path 65 taken by a light beam introduced by a single optical fiber 66 is shown. If the opposite edges are inclined at too great an angle with respect to one another, a significant non-uniformity in the illumination of the interior of the light pipe can result. Hence, the inclination angle 67 is preferably set at as small a value as possible. On the other hand, the inclination angle must be large enough to assure that the distance 68 between the entry of the light into light pipe 60 along edge 61 and the first reflection from edge 61 is sufficient to prevent intensity bands or other bright spots.

At least one of the pairs of edges should be non-parallel. Consider the case in which the light pipe is a parallelogram. That is, opposite edges are parallel to one another. In this case, the light from the fiber will return to the point of injection after three reflections. Hence, the banding problem discussed above will still be present; although the pattern will be somewhat different.

It should be noted that the average of the facets shown in FIG. 5 provide the advantages of "non-parallel edges" while preventing the non-uniformities discussed above. If the average of the facet edges is a line parallel to the opposite edge of the light pipe, then the non-uniformities are avoided while providing a substantial separation of the beams resulting from the injection of light through a given fiber.

The embodiment shown in FIG. 5 includes only one faceted edge. However, embodiments in which facets are included in one or more of the other edges can also be constructed. In this case, the facets are chosen such that the lines defined by the average of the facets on each of the two opposing edges are substantially parallel.

The embodiments discussed above rely on the natural divergence of the light beams leaving the optical fibers and a large number of reflections to provide uniformity in the illumination of the top surface of the light pipe. However, it should be noted that each optical fiber can be terminated in an inexpensive lens assembly 54 to increase either the divergence of the light beam from the fiber or to expand the light beam to a larger colliminated light beam to further improve the uniformity of the light source.

Figure 7:
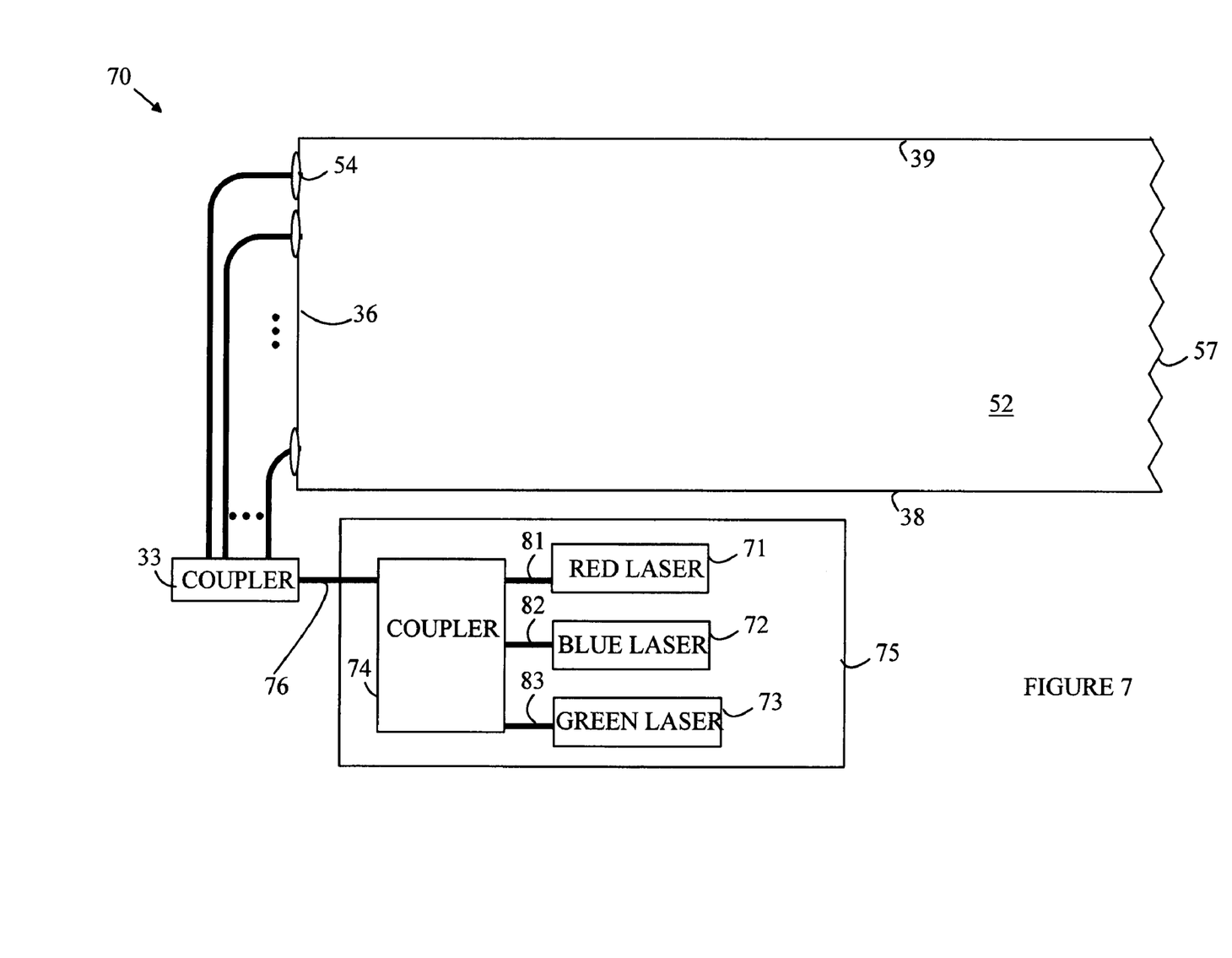
FIG. 7 is a top view of a light source according to another embodiment of the present invention.

The above-described embodiments of the present invention utilize a single color light source. As noted above, a light source for a back-lighted display requires light in at least three bands, typically red, blue, and green. Refer now to FIG. 7, which is a top view of a light source according to another embodiment of the present invention. To simplify the following discussion, those elements of light source 70 that serve functions analogous to functions discussed above with reference to light source 50 have been given the same numeric designations and will not be discussed further here. Light source 70 utilizes three lasers 71-73 connected to a heat sink 75. The lasers provide output light in the red, blue, and green spectral regions, respectively. The light from each laser is coupled to an optical fiber as shown at 81-83. The light from optical fibers 81-83 is coupled into a single optical fiber 76 by coupler 74. The light in optical fiber 76 provides the input to coupler 74. Hence, the optical fibers that form the input to light pipe 52 deliver the mixed light directly to light pipe 52. Typically, the relative intensities of the light from lasers 71-73 is adjusted such that the light is perceived to be a white incandescent light source of a specified color temperature by a human observer.

Figure 8:
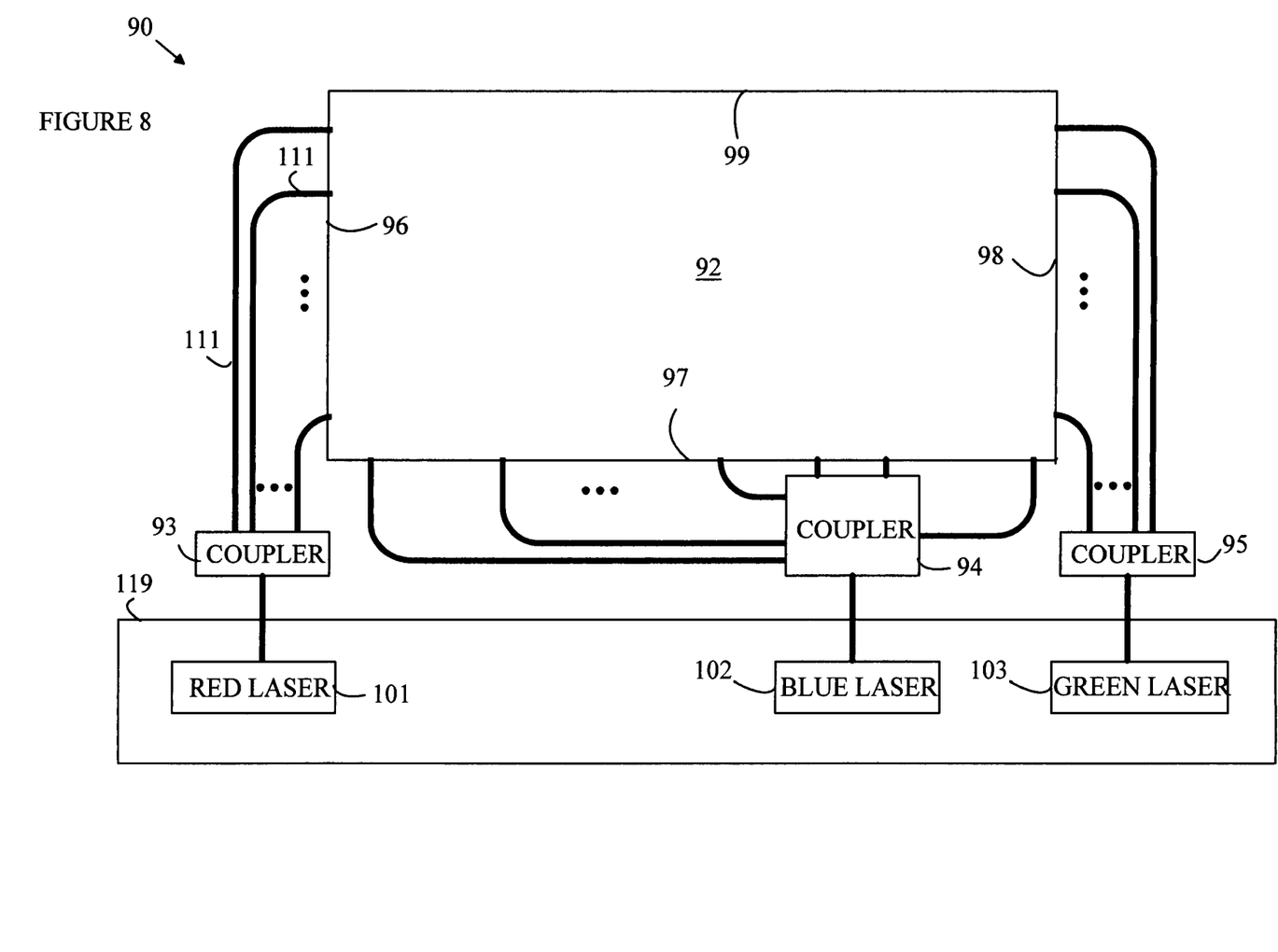
FIG. 8 is a top view of a light source according to another embodiment of the present invention.

Refer now to FIG. 8, which is a top view of a light source according to another embodiment of the present invention. Light source 90 includes a light pipe 92 that is illuminated by the light from the red, blue, and green lasers shown at 101-103, respectively. The light from each laser is directed through a corresponding edge of light pipe 92. For example, the light from laser 101 is coupled to optical fibers 111 that are connected to edge 96 by a coupler 93 in a manner analogous to that described above. Similarly, the light from laser 102 is coupled to edge 97 via coupler 94, and the light from laser 103 is coupled to edge 98 by coupler 95. In this embodiment, edge 99 is not used to couple light into light pipe 92; however, embodiments that utilize 4 colors to provide better color rendering can be constructed by utilizing edge 99 to couple light from a fourth laser. In the embodiment shown in FIG. 7, the lasers are mounted on a heat sink 119 that is placed at a location that provides heat dissipation to the outside ambient air.

To simplify FIG. 8, the facets discussed above have been omitted from the drawing. However, embodiments in which facets are introduced into the edges of light pipe 92 can also be constructed. To maximize the light coverage, such facets can be introduced into all four edges of light pipe 92. Alternatively, as noted above, the shape of light pipe 92 can be chosen such that opposite edges are not quite parallel to one another. If the opposite edges are made reflective and are inclined at a small angle with respect to one another, the light beam from any given fiber will reflect off of the opposite edge and return to the edge corresponding to that fiber at a location that is displaced from the fiber.

The embodiment shown in FIG. 8 utilizes an arrangement in which optical fibers carrying different colors of light are coupled to different edges of the light pipe. However, embodiments in which different colors of light are coupled to the same edge of the light pipe can also be constructed. Such embodiments require more complex routing of the individual optical fibers from the various couplers.

The above-described embodiments utilize an optical fiber arrangement in which the light is injected into the light pipe at an angle that is substantially perpendicular to the edge on which the optical fiber is located. However, embodiments in which the light is injected at a different angle can also be constructed.

Figure 9:
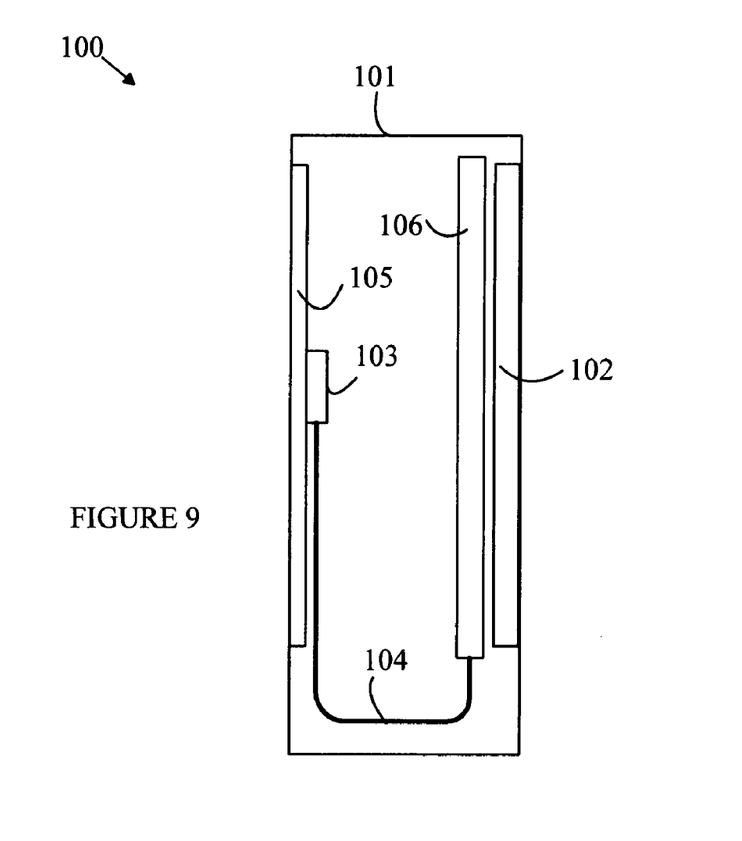
FIG. 9 is a cross-sectional view of a device 100 that utilizes a light source according to one embodiment of the present invention.

As noted above, a light source according to the present invention can provide efficient injection of light from the laser into the light pipe while allowing the laser to be placed at a location that facilitates the transfer of heat from the laser to the surrounding environment. Refer now to FIG. 9, which is a cross-sectional view of a device 100 that utilizes a light source according to one embodiment of the present invention. Device 100 could, for example, be a small handheld device or a large display system such as an LCD television screen. To simplify the drawing, non-display components of device 100 have been omitted from the drawing. Device 100 includes an enclosure 101 having an LCD display panel 102 on one edge thereof. LCD display panel 102 is illuminated by light from light pipe 106. Light is injected into light pipe 106 from a laser 103 via optical fiber 104. Laser 103 is mounted on a heat sink 105 that is in thermal contact with one of the walls of enclosure 101. While device 100 is shown as having only one laser, embodiments that include a plurality of lasers can be constructed in a similar manner. In one such embodiment, all of the lasers are located on the same heat sink.

Figure 10:
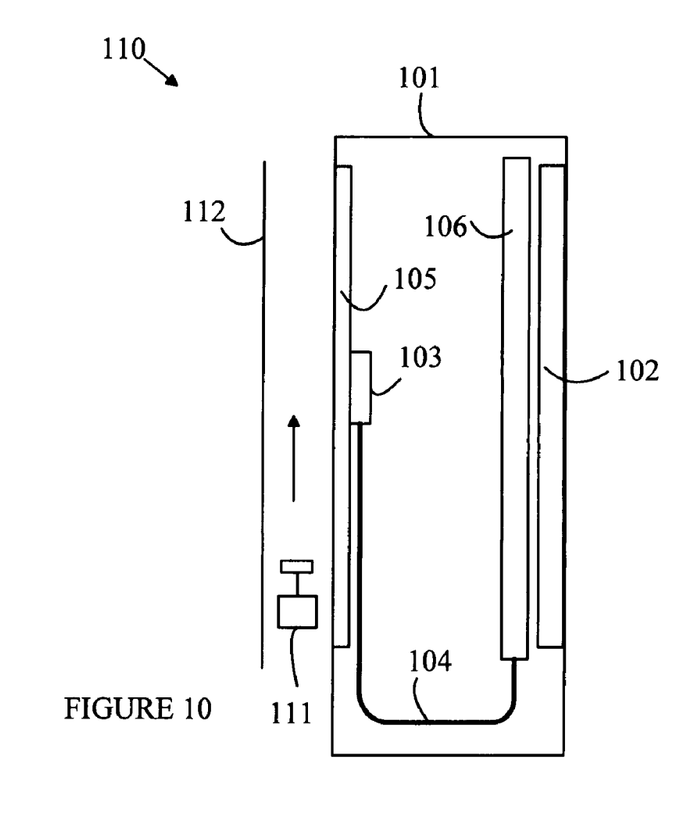
FIG. 10 is a cross-sectional view of a device 110 that utilizes another embodiment of a light source according to the present invention.

It should also be noted that the heat sink shown in FIG. 9 might include an active cooling mechanism. Refer now to FIG. 10, which is a cross-sectional view of a device 110 that utilizes another embodiment of a light source according to the present invention. To simplify the following discussion, those elements of device 110 that serve functions analogous to those served by elements of device 100 discussed above have been given the same numeric designations and will not be discussed further here. Device 110 includes a baffle 112 that defines an air passage adjacent to the wall of enclosure 101 along which heat sink 105 is located. A fan 111 moves air through the baffle to provide active cooling for heat sink 105. Such an arrangement is particularly useful in a large TV display that utilizes a relatively high power illumination system.

The above-described embodiments of the present invention have been explained in terms of a back light for an LCD display. However, a light source according to the present invention can be utilized with any display device that requires a backlight including displays that utilize fixed transparencies.

Various modifications to the present invention will become apparent to those skilled in the art from the foregoing description and accompanying drawings. Accordingly, the present invention is to be limited solely by the scope of the following claims.

What is claimed is:

1. A light source comprising:
a first laser emitting light at a first wavelength;
a light pipe comprising a layer of transparent material having a top surface, a bottom surface, and a first edge;
a first optical fiber having a first end proximate to said first edge and a second end that receives light from said first laser, said light from said first end being injected into said light pipe at a first location; and
a second optical fiber having first and second ends and a coupler, said light of said first wavelength from said first laser being coupler to said first and second optical fibers via said coupler, said first end of said second optical fiber being proximate to said first edge and positioned such that light from said first end of said second optical fiber is injected into said light pipe at a second location different from said first location.

2. A light source comprising:
a first laser emitting light at a first wavelength;
a light pipe comprising a layer of transparent material having a top surface, a bottom surface, and a first edge; and
a first optical fiber having a first end proximate to said first edge and a second end that receives light from said first laser, said light from said first end being injected into said light pipe at a first location;
wherein said light pipe is characterized by a maximum physical dimension and wherein the optical transmission length of a reflector is greater than 2 of said maximum physical dimension.

3. A light source comprising:
a first laser emitting light at a first wavelength;
a light pipe comprising a layer of transparent material having a top surface, a bottom surface, and a first edge; and
a first optical fiber having a first end proximate to said first edge and a second end that receives light from said first laser, said light from said first end being injected into said light ripe at a first location;
wherein said light pipe includes second, third, and fourth edges, and wherein said second, third, and fourth edges reflect light striking those edges back into said light pipe, said second edge being opposite to said first edge; and
wherein said second edge comprises planar facets, one of said planar facets comprising a planar reflective surface that reflects light back into said light pipe such that light that is injected into said light pipe at said first location is reflected back into said light pipe such that said reflected light strikes said first edge at a location separated from said first location by a predetermined distance that is greater than zero.

4. The light source of claim 1 further comprising a second laser that emits light of a second wavelength different from said first wavelength, light from said second laser being injected into said light pipe.

5. The light source of claim 4 further comprising a light combiner that mixes light from said first and second laser to create a mixed light signal and a coupler that injects said mixed light signal into said first optical fiber.

6. The light source of claim 4, wherein said light pipe comprises a second edge and wherein said light source comprises a second optical fiber having a first end proximate to said second edge and a second end that receives light from said second laser, said light from said first end being injected into said light pipe at a second location on said second edge.

7. An apparatus comprising:
an enclosure having first and second sides;
a light pipe comprising a sheet of transparent material having a top surface, a bottom surface, and a first edge;
an LCD display panel that is illuminated by light leaving said top surface, said LCD display panel being located adjacent to said first side of said enclosure;

a first laser emitting light at a first wavelength;
a first optical fiber having a first end proximate to said first edge and a second end that receives light from said first laser, said light from said first end being injected into said light pipe at a first location; and
a heat sink thermally connected to said first laser and said second side of said enclosure, said heat sink transferring heat from said first laser to said second side of said enclosure;
wherein said light is injected into said light pipe such that said light is reflected from said top surface and wherein said light pipe comprises a plurality of scattering centers that scatter said light such that a portion of said scattered light strikes said top surface of said light pipe at angles such that said scattered light leaves said light pipe through said top surface.

8. An apparatus comprising:
an enclosure having first and second sides;
a light pipe comprising a sheet of transparent material having a top surface, a bottom surface, and a first edge;
a display that is illuminated by light leaving said top surface, said display being located adjacent to said first side of said enclosure;
a first laser emitting light at a first wavelength;
a first optical fiber having a first end proximate to said first edge and a second end that receives light from said first laser, said light from said first end being injected into said light pipe at a first location;
a heat sink thermally connected to said first laser and said second side of said enclosure, said heat sink transferring heat from said first laser to said second side of said enclosure; and
a second optical fiber having first and second ends and a coupler, said light of said first wavelength from said first laser being coupled to said first and second optical fibers via said coupler, said first end of said second optical fiber being proximate to said first edge and positioned such that light from said first end of said second optical fiber is injected into said light pipe at a second location different from said first location.

9. An apparatus comprising:
an enclosure having first and second sides;
a light pipe comprising a sheet of transparent material having a top surface, a bottom surface, and a first edge;
an LCD display panel that is illuminated by light leaving said top surface, said LCD display panel being located adjacent to said first side of said enclosure;
a first laser emitting light at a first wavelength;
a first optical fiber having a first end proximate to said first edge and a second end that receives light from said first laser, said light from said first end being injected into said light pipe at a first location; and
a heat sink thermally connected to said first laser and said second side of said enclosure, said heat sink transferring heat from said first laser to said second side of said enclosure;
wherein said light pipe includes second, third, and fourth edges, and wherein said second, third, and fourth edges reflect light striking those edges back into said light pipe, said second edge being opposite to said first edge.

10. The apparatus of claim 9 wherein said second edge is oriented at an angle with respect to said first edge, said angle being different from zero.

11. The apparatus of claim 9 wherein said second edge comprises planar facets, one of said planar facets comprising a planar reflective surface that reflects light back into said light pipe such that light that is injected into said light pipe at said First location is reflected back into said light pipe such that said reflected light strikes said first edge at a location separated from said first location by a predetermined distance that is greater than zero.

12. The apparatus of claim 9 wherein said first optical fiber has a circular cross-section of a first diameter and wherein said predetermined distance is greater than said first diameter.

13. An apparatus comprising:
an enclosure having first and second sides;
a light pipe comprising a sheet of transparent material having a top surface, a bottom surface, and a first edge;
an LCD display panel that is illuminated by light leaving said top surface, said LCD display panel being located adjacent to said first side of said enclosure;
a first laser emitting light at a first wavelength;
a first optical fiber having a first end proximate to said first edge and a second end that receives light from said first laser, said light from said first end being injected into said light pipe at a first location; and
a heat sink thermally connected to said first laser and said second side of said enclosure, said heat sink transferring heat from said first laser to said second side of said enclosure;
further comprising a second laser that emits light of a second wavelength different from said first wavelength, light from said second laser being injected into said light pipe.

14. The apparatus of claim 13 further comprising a light combiner that mixes light from said first and second laser to create a mixed light signal and a coupler that injects said mixed light signal into said first optical fiber.

15. The apparatus of claim 13, wherein said light pipe comprises a second edge and wherein said apparatus comprises a second optical fiber having a first end proximate to said second edge and a second end that receives light from said second laser, said light from said first end being injected into said light pipe at a second location on said second edge.

16. The light source of claim 1 wherein said light is injected into said light pipe such that said light is reflected from said top surface and wherein said light pipe comprises a plurality of scattering centers that scatter said light such that a portion of said scattered light strikes said top surface of said light pipe at angles such that said scattered light leaves said light pipe through said top surface.

17. The light source of claim 16 wherein said bottom surface of said light pipe is reflective.

18. The light source of claim 1 wherein said first laser is in thermal contact with a heat sink.

19. A light source comprising:
a first laser emitting light at a first wavelength;
a light ripe comprising a layer of transparent material having a top surface, a bottom surface, and a first edge; and
a first optical fiber having a first end proximate to said first edge and a second end that receives light from said first laser, said light from said first end being injected into said light pipe at a first location;
wherein said light pipe includes second, third, and fourth edges, and wherein said second, third, and fourth edges reflect light striking those edges back into said light pipe, said second edge being opposite to said first edge;
wherein said light is injected into said light pipe such that said light is reflected from said top surface and wherein said light pipe comprises a plurality of scattering centers that scatter said light such that a portion of said scattered light strikes said top surface of said light pipe at angles such that said scattered light leaves said light pipe through said top surface; and wherein said bottom surface of said light pipe is reflective.

20. A light source comprising:
a first laser emitting light at a first wavelength;
a light pipe comprising a layer of transparent material having a top surface, a bottom surface, and a first edge; and
a first optical fiber having a first end proximate to said first edge and a second end that receives light from said first laser, said light from said first end being injected into said light pipe at a first location;
wherein said light pipe includes second, third, and fourth edges, and wherein said second, third, and fourth edges reflect light striking those edges back into said light pipe, said second edge being opposite to said first edge; and
wherein said first laser is in thermal contact with a heat sink.

21. A light source comprising:
a first laser emitting light at a first wavelength;
a light pipe comprising a layer of transparent material having a top surface, a bottom surface, and a first edge; and
a first optical fiber having a first end proximate to said first edge and a second end that receives light from said first laser, said light from said first end being injected into said light pipe at a first location;
wherein said light pipe includes second, third, and fourth edges, and wherein said second, third, and fourth edges reflect light striking those edges back into said light pipe, said second edge being opposite to said first edge; and
further comprising a second laser that emits light of a second wavelength different from said first wavelength, light from said second laser being injected into said light pipe.

22. The light source of claim 21 further comprising a light combiner that mixes light from said first and second laser to create a mixed light signal and a coupler that injects said mixed light signal into said first optical fiber.

23. The light source of claim 21, wherein said light source comprises a second optical fiber having a first end proximate to said second edge of said light pipe and a second end that receives light from said second laser, said light from said first end being injected into said light pipe at a second location on said second edge.

24. The light source of claim 2 wherein said light is injected into said light pipe such that said light is reflected from said top surface and wherein said light pipe comprises a plurality of scattering centers that scatter said light such that a portion of said scattered light strikes said top surface of said light pipe at angles such that said scattered light leaves said light pipe through said top surface.

25. The light source of claim 24 wherein said bottom surface of said light pipe is reflective.

26. The light source of claim 2 wherein said first laser is in thermal contact with a heat sink.

27. The light source of claim 2 further comprising a second laser that emits light of a second wavelength different from said first wavelength, light from said second laser being injected into said light pipe.

28. The light source of claim 27 further comprising a light combiner that mixes light from said first and second laser to create a mixed light signal and a coupler that injects said mixed light signal into said first optical fiber.

29. The light source of claim 27, wherein said light pipe comprises a second edge and wherein said light source comprises a second optical fiber having a first end proximate to said second edge and a second end that receives light from said second laser, said light from said first end being injected into said light pipe at a second location on said second edge.

* * * * *

UNITED STATES PATENT AND TRADEMARK OFFICE
CERTIFICATE OF CORRECTION

PATENT NO. : 7,581,863 B2  Page 1 of 1
APPLICATION NO. : 11/198474
DATED : September 1, 2009
INVENTOR(S) : Steven D. Lester It is certified that error appears in the above-identified patent and that said Letters Patent is hereby corrected as shown below:

Column 8, Line 7, Claim 1, delete "coupler" and insert --coupled--.

Column 8, Line 34, Claim 3, delete "ripe" and insert --pipe--.

Column 10, Line 1, Claim 11, delete "First" and insert --first--.

Column 10, Line 51, Claim 19, delete "ripe" and insert --pipe--.

Signed and Sealed this
Second Day of October, 2012

David J. Kappos
*Director of the United States Patent and Trademark Office*